United States Patent
Fritsch et al.

(10) Patent No.: US 7,747,995 B2
(45) Date of Patent: Jun. 29, 2010

(54) METHOD AND SYSTEM FOR CONTROLLING SOFTWARE VERSION UPDATES

(75) Inventors: Brindusa L. Fritsch, Toronto (CA); Viera Bibr, Kilbride (CA); Vladimir Blagojevic, Manchester (GB); Bryan R. Goring, Milton (CA); Michael Shenfield, Richmond Hill (CA); Kamen B. Vitanov, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 1114 days.

(21) Appl. No.: 11/402,112

(22) Filed: Apr. 11, 2006

(65) Prior Publication Data

US 2006/0236083 A1 Oct. 19, 2006

Related U.S. Application Data

(60) Provisional application No. 60/672,096, filed on Apr. 18, 2005.

(51) Int. Cl.
G06F 9/44 (2006.01)
G06F 9/45 (2006.01)

(52) U.S. Cl. .................. 717/168; 717/173; 709/203

(58) Field of Classification Search ......... 717/168–174; 709/203–204
See application file for complete search history.

(56) References Cited

U.S. PATENT DOCUMENTS

| | | | |
|---|---|---|---|
| 5,404,488 A | 4/1995 | Kerrigan et al. | |
| 5,896,566 A | 4/1999 | Averbuch et al. | |
| 6,256,664 B1 * | 7/2001 | Donoho et al. | 709/204 |
| 6,304,881 B1 | 10/2001 | Halim et al. | |
| 6,345,288 B1 | 2/2002 | Reed et al. | |
| 6,385,770 B1 * | 5/2002 | Sinander | 717/170 |
| 6,574,657 B1 * | 6/2003 | Dickinson | 709/203 |
| 6,779,177 B1 * | 8/2004 | Bahrs et al. | 717/173 |
| 6,886,029 B1 * | 4/2005 | Pecus et al. | 709/203 |
| 7,003,534 B2 * | 2/2006 | Peng | 707/203 |
| 7,003,767 B2 * | 2/2006 | Larkin | 717/172 |
| 7,055,149 B2 * | 5/2006 | Birkholz et al. | 717/172 |
| 7,149,508 B2 * | 12/2006 | Herle | 455/418 |
| 7,424,707 B2 * | 9/2008 | De Boer et al. | 717/173 |
| 7,461,373 B2 * | 12/2008 | Herle et al. | 717/171 |

(Continued)

FOREIGN PATENT DOCUMENTS

EP 1489501 12/2004

(Continued)

OTHER PUBLICATIONS

Saito et al, "Gateway technologies for home network and their implementations", IEEE, pp. 175-180, 2001.*

(Continued)

*Primary Examiner*—Anil Khatri
(74) *Attorney, Agent, or Firm*—Eckert Seamans Cherin & Mellott, LLC; Brij K. Agarwal, Esq.

(57) ABSTRACT

Methods and systems are provided for controlling asynchronous distribution and installation of software updates affecting applications installed on terminal devices of a wireless network. A versioning schema enforced by the application development environment enables the runtime environment of a terminal device to evaluate a software update to identify potential compatibility issues and control installation of the update.

18 Claims, 5 Drawing Sheets

U.S. PATENT DOCUMENTS

| | | | | |
|---|---|---|---|---|
| 7,516,450 | B2 * | 4/2009 | Ogura | 717/168 |
| 7,516,451 | B2 * | 4/2009 | Peng | 717/173 |
| 7,526,534 | B2 * | 4/2009 | Henseler | 709/220 |
| 7,552,430 | B2 * | 6/2009 | Napier et al. | 717/169 |
| 7,552,431 | B2 * | 6/2009 | Napier et al. | 717/169 |
| 7,657,884 | B2 * | 2/2010 | Okonnen et al. | 717/168 |
| 2002/0166001 | A1 | 11/2002 | Cheng et al. | |
| 2003/0186689 | A1 | 10/2003 | Herle et al. | |
| 2004/0024795 | A1 | 2/2004 | Hind et al. | |
| 2004/0024878 | A1 | 2/2004 | Makimoto et al. | |
| 2004/0068721 | A1 | 4/2004 | O'Neill et al. | |
| 2004/0098421 | A1 | 5/2004 | Peng | |
| 2004/0203693 | A1 | 10/2004 | Mehta et al. | |

FOREIGN PATENT DOCUMENTS

| | | |
|---|---|---|
| WO | 0169888 A1 | 9/2001 |
| WO | 2004006158 A1 | 1/2004 |

OTHER PUBLICATIONS

Gibbins et al, "Agent based semantic web services", ACM WWW, pp. 710-717, 2003.*

Adams et al, "UDDI and WSDL extensions for web services: A security framework", ACM, pp. 30-35, 2002.*

Suryanarayana et al, "Profiles for the situated web", ACM WWW, pp. 200-209, 2002.*

Extended European Search Report mailed Apr. 10, 2007.

* cited by examiner

METHOD AND SYSTEM FOR CONTROLLING SOFTWARE VERSION UPDATES

CROSS-REFERENCE TO RELATED APPLICATION

The instant application claims priority from U.S. Provisional Patent Application Ser. No. 60/672,096 filed Apr. 18, 2005, the disclosures of which are incorporated herein by reference.

TECHNICAL FIELD

The present invention relates to wireless communications devices, and in particular to a method and system for controlling software version updates for wireless terminal devices.

BACKGROUND OF THE INVENTION

The number and variety of wireless terminal devices, such as mobile telephones, wireless-enabled laptops and PDAs with wireless communication capabilities, self-service kiosks and two-way pagers are rapidly increasing. Software applications which run on these devices increase their utility. For example, a mobile phone may include an application which retrieves the weather for a range of cities, or a PDA may include an application that allows a user to shop for groceries. These software applications take advantage of the connectivity to a network in order to provide timely and useful services to users.

As is well known in the art, software application developers frequently produce new and/or updated versions of their software. Such software updates may be released on a very frequent basis, as, for example, in the case of patches to resolve defects in previously released software. Major upgrades may be released on, for example, a yearly or bi-yearly basis, and often provide new functions to enhance the utility of a particular device.

However, while software developers may readily develop and release software updates, actual implementation of updates on all of the affected devices is highly complex. For example, in a wireless network, connectivity is frequently intermittent, so that a particular device may not be connected to a network when an update is released. In this case, some means is needed to enable the update to be downloaded and installed at some later time. Even when this is accomplished, some devices may lack resources (such as sufficient memory) to download and successfully install a particular update. In other cases, an application update may require that a device's controller software be updated before the application update is installed. In still other cases, a series of application updates must be downloaded and installed in a particular order. Thus, for example, an application upgrade which provides a new feature, must be installed before a service patch which corrects several issues including a deficiency in the new feature.

Accordingly, methods and systems for controlling the installation of software updates to wireless terminal devices remains highly desirable.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

An object of the present invention is to provide methods and systems for controlling the installation of software updates to wireless terminal devices.

Thus, an aspect of the present invention provides a method of controlling asynchronous installation of a software update on a terminal device of a wireless network. According to the present invention, an update notification message in respect of the software update is received by an Application Gateway hosting the terminal device. The update notification message includes a software identifier uniquely identifying an application affected by the update; a version number associated with the software update; and an address of an update script on a data network accessible by the terminal device. The update script is adapted to install the software update on the terminal device. The update notification message is logged in an updates registry, and a notification message is forwarded to the terminal device. The notification message includes the software identifier, the version number and the address of the update script, so that the terminal device can access and execute the update script to install the software update.

A further aspect of the present invention provides a method of controlling installation of a software update on a terminal device of a wireless network. According to the present invention, an update-notification message including information respecting an available software update is received by a runtime environment of the terminal device. The update notification message comprises: a software identifier uniquely identifying an application affected by the update; a version number associated with the software update; and an address of an update script on a data network accessible by the terminal device, the update script being adapted to install the software update on the terminal device. A compatibility of the software update is determined using the update version number. Thereafter, the update script is accessed using the address, and executed to install the software update.

A still further aspect of the present invention provides a method of enabling controlled distribution of software updates affecting an application installed on a plurality of terminal devices of a wireless network. According to the present invention a version schema is defined including a respective field for each one of a plurality of aspects of the application. An initial value of each field is defined when an initial application load is released. For each successive software update affecting the application, each aspect of the application affected by the software update is identified, and the value of the respective field is incremented.

The present invention provides methods and systems for controlling the distribution and installation of software updates on wireless terminal devices. Embodiments of the invention are described below, by way of example only, with reference to FIGS. 1-5.

Figure 1:
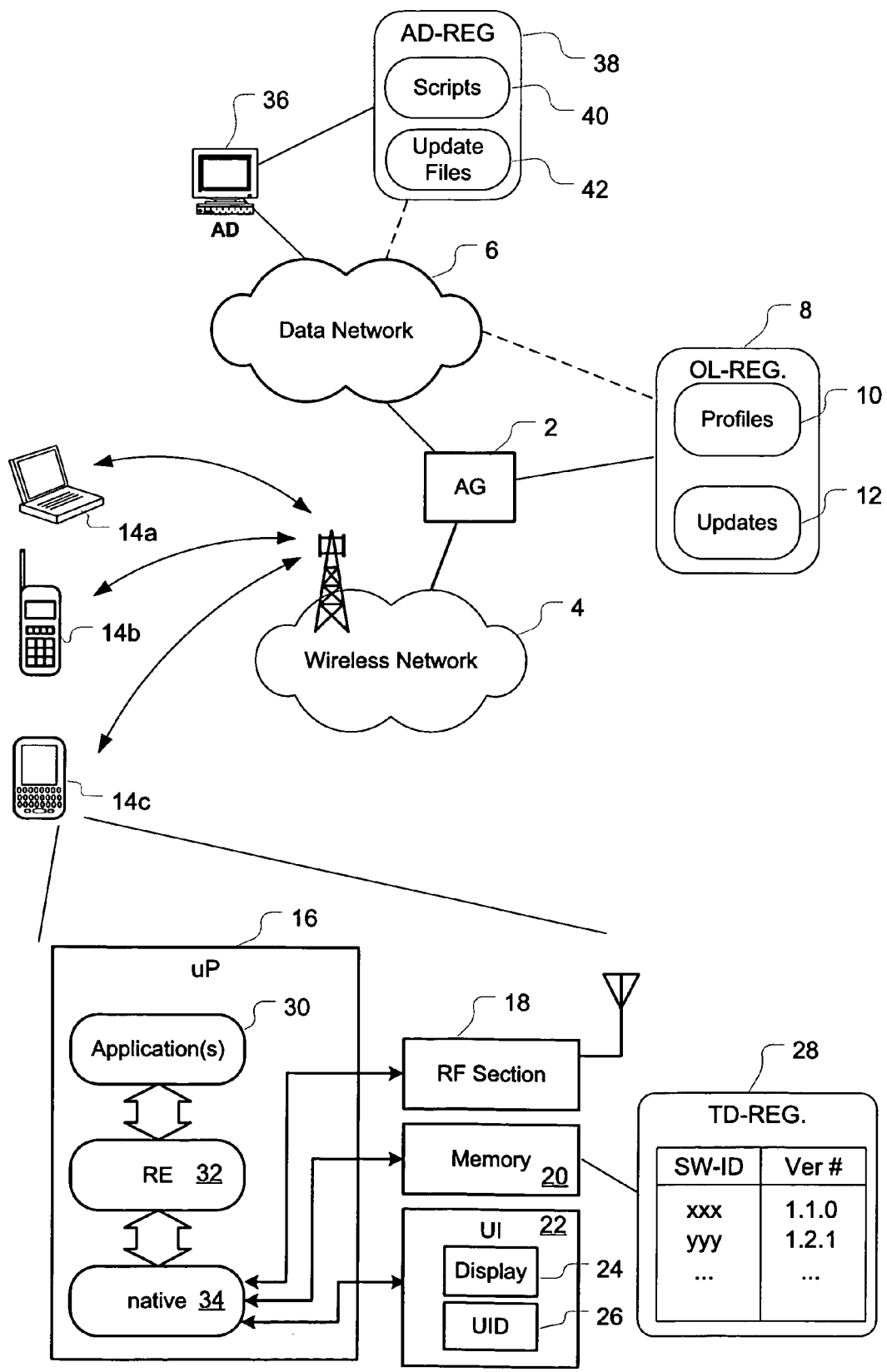
FIG. 1 is a block diagram schematically illustrating a network system.

Referring to FIG. 1, a system in accordance with a representative embodiment of the present invention generally comprises an Application Gateway (AG) 2 coupled between a wireless network 4 and a data network 6, such as for example, the Internet. The system also has an online registry 8 including: a profiles registry 10 containing, for each subscriber's terminal device(s) 14a, 14b, 14c, a listing of information identifying software applications stored on the respective terminal device; and an updates registry 12 containing information identifying any available application updates.

The AG 2 generally operates to mediate message flows between terminal devices 14a, 14b, 14c connected to the wireless network 4 and data services accessible through the data network 6 in the manner described in Applicant's co-pending United States Patent Publications Nos. 2004/0215700 and 2004/0220998, both of which are incorporated herein by reference.

The online registry 8 can be co-resident with the AG 2 or may be located remotely from the AG and accessed by the AG via the data network 6. In the embodiment of FIG. 1, the online registry 8 includes a profiles registry 10 and an updates registry 12. The profiles registry 10 contains a profile for each one of a plurality of terminal devices. Each profile contains, at a minimum, a listing of software identifiers (SW-IDs) uniquely identifying the runtime environment (RE) and each application installed on the respective terminal device. A respective "current" version number of each application installed on the terminal device may also be stored in the online registry 8 in association with the respective SW-ID, or may be stored in the terminal device. A separate scripts registry 40 contains, for each software update, one or more scripts designed for implementing the software update on a terminal device.

In general, the terminal devices can be any of a wide variety of software-controlled wireless devices including but not limited to wireless-enabled laptop computers 14a, mobile or cellular telephones 14b, PDAs with wireless communication capabilities 14c, self-service kiosks and two-way pagers. As may be seen in FIG. 1, such devices generally include a microprocessor 16 connected to an RF section 18 for wireless communications, a memory 20 (at least a portion of which will normally be non-volatile), and a user interface (UI) 22 including a display 24 and one or more user input devices (UID) 26, e.g. a keyboard, thumb-wheel, stylus, microphone, etc.). The microprocessor 16 operates under software control to provide the functionality of the terminal device. Preferably, the software is designed on a layered model, in which an RE 32 translates between application software 30 and the native machine-language 34 of the terminal device to control the terminal device hardware, and communicate with data services. This layered software model, and the manner in which it operates, is known from Applicant's co-pending United States Patent Publications Nos. 2004/0215700 and 2004/0220998. The RE can also maintain a terminal device registry 28 (denoted "TD-REG" in FIG. 1) identifying each application installed on the terminal device, and the current version number of each application. Operation of the RE to enable asynchronous distribution and installation of software upgrades to terminal devices will be described in detail below.

As described in Applicant's co-pending United States Patent Publications Nos. 2004/0215700 and 2004/0220998, operation of the AG 2 enables a software application executing in a terminal device to communicate with data services (not shown) offered through the data network 6. This operation may, for example, include accessing and downloading files from back-end data sources (not shown) connected to the data network 6. As may be seen in FIG. 1, and described in greater detail below, an application developer (AD) 36 can also distribute and support new or updated software through the data network 6. For example, downloadable application software and installation scripts can be stored in an application developer registry 38 which can be accessed by users (either directly or indirectly) through the data network 6.

Application Development Environment

Figure 2:
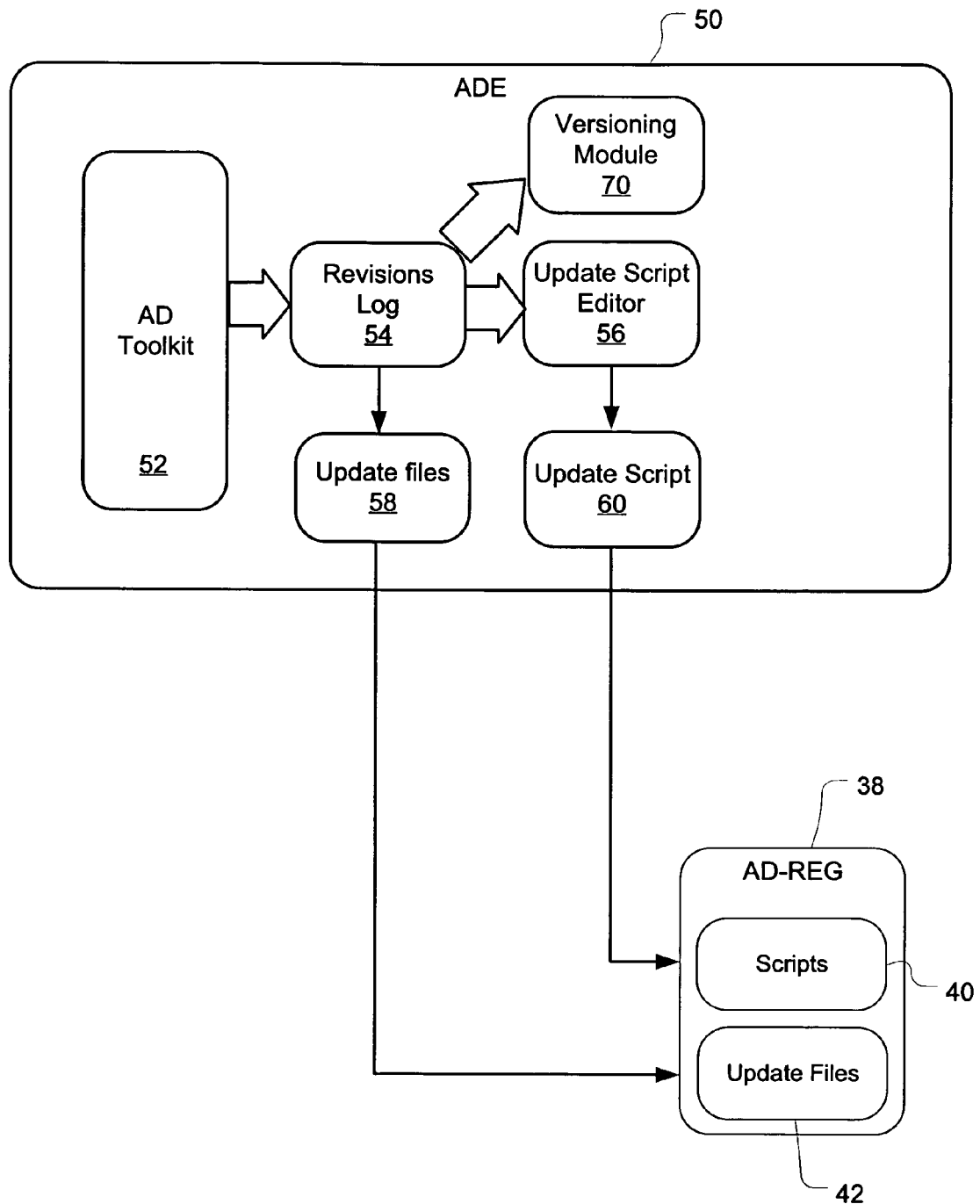
FIG. 2 is a block diagram schematically illustrating components and operation of an application development environment in accordance with an aspect of the present invention.

Referring now to FIG. 2, the application developer uses an application development toolkit (ADT) 52 of an application development environment (ADE) 50 running on a computing device to code, test, and debug application software, in a manner generally known in the art. The computing device can be a personal computer or laptop connected or connectable to the data network or other networked workstation. This same ADE is also used for developing subsequent updates of the application, again in a manner known in the art. In accordance with the present invention, the ADE 50 also includes a versioning module 70, which automatically assigns a version number based on changes made in the application source code during the process of coding, testing, and debugging. The versioning module 70 can also be used to generate an update script 60 which, when executed in a terminal device, will download and install the update on the terminal device.

For example, the versioning module 70 can be used to identify any of the following:

changes in existing data components, such as data structures, i.e. by adding or removing fields, or changing field type definition; changes in global variable definitions or enumerations;

changes in existing messages, i.e. by adding or removing fields, or changing field type definition;

changes in existing application logic;

new data components, messages or application logic to be added to the application.

In each of these cases, the changes and additions detected by the versioning module 70 are those relative to the "current" version of the application (that is, the initial release with any subsequently released updates installed). As may be appreciated, detection of changes can be performed by either real-time tracking of actions (e.g. keystrokes) of the application developer during the editing process using a revisions log 54, or by comparing "before" and "after" versions of the application source code or by any other means for comparing an updated version of the application with a previous version of the application to determine what changes have been made. In either case, the versioning module 70 identifies new and/or revised data components, messages, and application logic, which are then written to one or more update files 58. These update files 58 can then be saved to an update files registry 42, which is preferably resident within the application developer registry 38 as depicted in FIGS. 1 and 2. Alternatively, in the embodiment as shown in FIG. 2, a revisions log 54 tracks the changes made to the application source code by the AD toolkit 52. It will be appreciated that the versioning module 70 can contain the revisions log 54 or the revisions log 54 can be a separate module within the ADE 50.

In addition, an update script 60 can be generated to control a terminal device to download and install the update file(s) 58, as will be described in greater detail below. The update script 60 can be saved to a scripts registry 40, which is preferably resident within the application developer registry 38 as depicted in FIG. 2.

If desired, a script editor module or update script editor 56 can be provided to enable the application developer to either compose the update script 60 manually, or to review and edit an auto-generated update script.

The update script 60 may conveniently be developed in a structured language, such as Java, JavaScript or XML, which thereby enables the device to access one or more back-end data sources, via the data network 6, during the update process. This enables the update script 60 to access and download the update file(s) 58 as needed, during execution. This facilitates the asynchronous distribution of the update, because the update script 60 can "pull" the necessary update files 58 from the back-end data source(s) during execution. Furthermore, in certain implementations, the notification message for the upgrade could contain enough information to enable the RE in the terminal device to pull the application updates itself.

Versioning Schema

As mentioned above, the versioning module 70 automatically assigns a respective version number to the initial release and each update of an application. In the case of an initial release, any desired "initial" version number can be used. However, following its initial release, each subsequent update is assigned an auto-generated version number based on the type of changes made by that update. This arrangement has a number of advantages. For example, because each version number is assigned by the versioning module 70, consistency between version numbers is enforced. This means, for example, that a terminal device's RE can use the version number of an update to determine whether any other updates must be installed first. Another advantage is that the RE of a terminal device can evaluate the version number of an update to detect potential compatibility issues, before attempting to install the update.

Both of these functions are enabled by a versioning schema that formats the version number into multiple fields, with each field representing a respective different aspect of the application. For example, the versioning module is designed to detect changes in existing data components, messages or logic, as well as the addition of new data components, messages or logic. In principle, each of these elements can be represented by a respective field of the version number. However, in practice it has been found that satisfactory performance can be obtained using a three-field schema of the form "Data.Messages.Features", as described in Table 1 below.

TABLE 1

| Field | Description |
| --- | --- |
| Data | Changes in existing Data definitions. This may include, for example: changes in data components (e.g. to add or remove a data field, of change a field type definition); persistent global variables; or enumerations. |
| Messages | Changes in Existing Messages used by the application. This may include, for example, changes in message components (e.g. to add or remove a field, change a field type definition, or change a mapping). |
| Features | Addition of features of the application. This may, for example, include additions or changes to application logic, screens and/or globals; addition of new messages; and/or addition of data components or fields. |

With this versioning schema, each field of the version number can be assigned an initial value (e.g. D=1, M=1, F=0) for the initial release of the application. Thereafter, for each update release, the versioning module automatically generates a respective version number for the update, by incrementing the value of the applicable fields.

For example, consider an application which is released bearing the version number "1.1.0", as described above. Following initial release, the application developer produces an application update, which modifies existing data fields, and adds new application logic. These changes will be reflected in the update's version number by incrementing the Data and Features fields. Thus, the first update's version number will be 2.1.1. Following release of the first update, its version number (2.1.1) becomes the "current" version number of the application, against which the next released application update will be compared. Thus, for example, consider a second application update, which modifies the format of an existing message. This change will be reflected in the second update's version number by incrementing the Messages field, so that the second update's version number will be 2.2.1.

As will be appreciated, this pattern can be continued for any number of updates, each of which may affect any one or more aspects of the application. It will also be appreciated that the version number schema can be extended to provide finer granularity. For example, the Features field could be replaced by a set of fields respectively indicating the addition of new data, messages or application logic. In another example, a field could be added to the version number to indicate whether or not the RE must be updated before installation of the application update.

It will also be appreciated that the present invention is not limited to applications per se. For example, the versioning number schema, and the updating methods described herein may equally be applied to the RE itself, thereby enabling controlled updating of the RE.

Asynchronous Software Distribution

Figure 3:
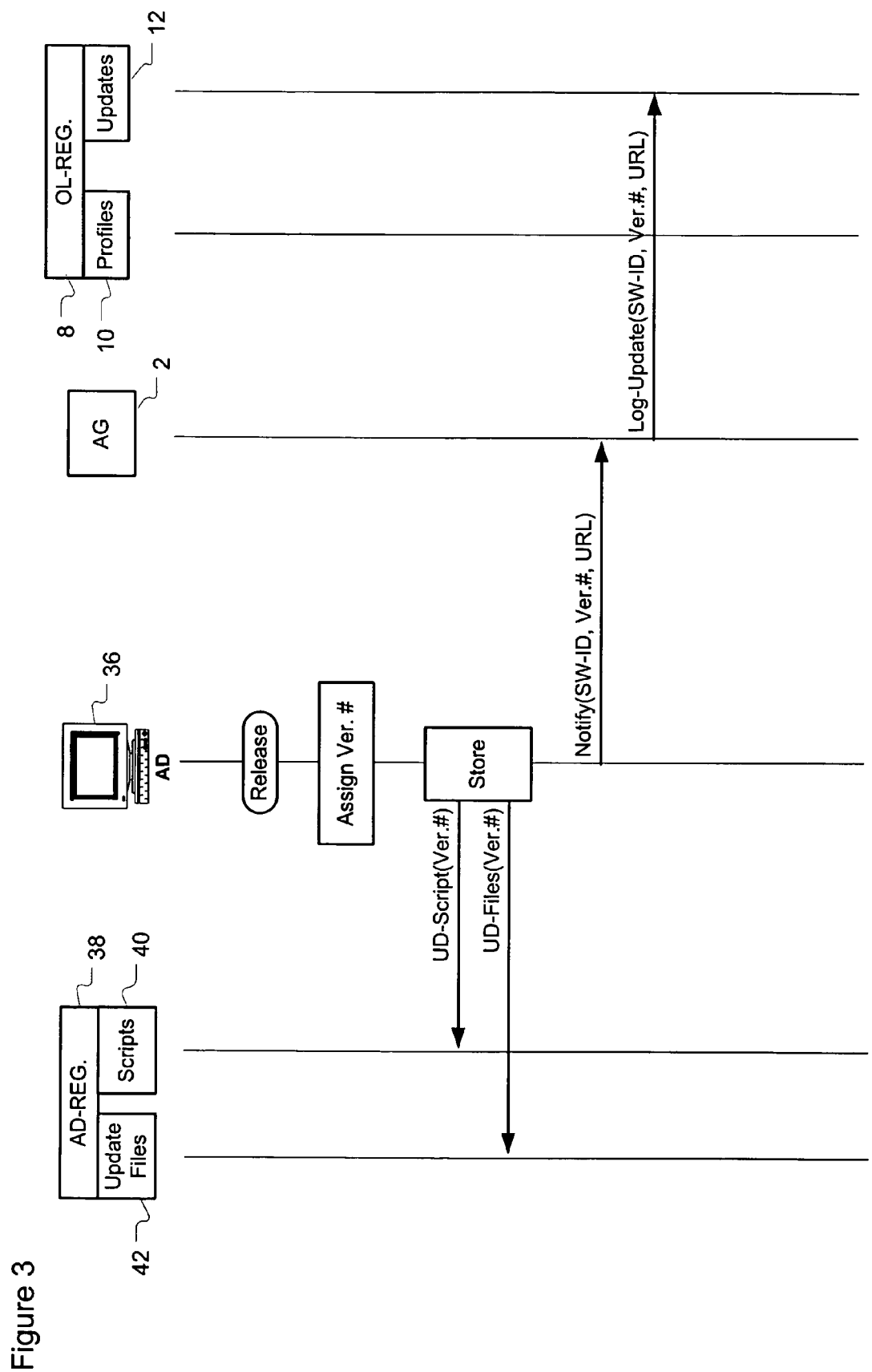
FIG. 3 is a message flow diagram schematically illustrating a process for publishing a software upgrade in accordance with an aspect of the present invention.

Referring to FIG. 3, when the application developer (AD) 36 issues a software release (of either an initial software load or an update), the versioning module assigns a version number, and stores the update script(s) and update file(s) in the AD registry 38. The AD 36 then sends an update notification message to the AG 2. The update notification message preferably includes a software identifier (SW-ID) uniquely identifying the application, the version number, and a link (e.g. a URL) to the update script stored in the scripts registry 40. When the AG 2 receives the update notification message from the AD 36, the AG 2 logs the update by storing the software ID, version number and script URL in the updates registry 12. Once the update has be logged by the AG 2, asynchronous distribution to users' terminal devices can be accomplished in a number of ways. Two representative distribution scenarios are described below with reference to FIGS. 4 and 5.

Figure 4:
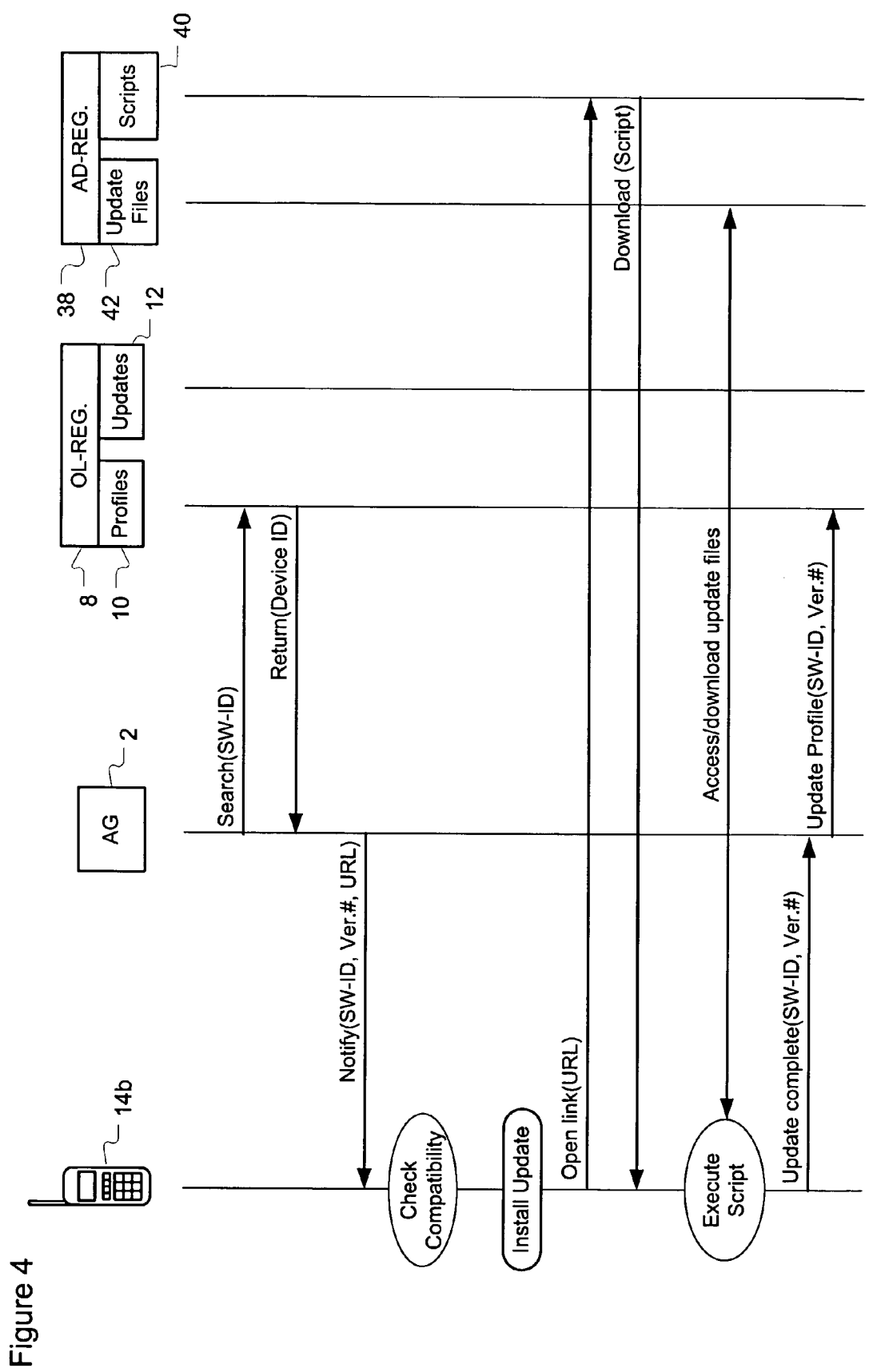
FIG. 4 is a message flow diagram schematically illustrating a process for installing a software upgrade on a terminal device in accordance with an embodiment of the present invention.

FIG. 4 illustrates an asynchronous distribution scenario which is initiated by the AG 2, for example, in response to receipt of the update notification message from the AD 36. In this case, the AG 2 uses the software ID (e.g. contained in the update notification) to search the profiles registry 10. This search returns information (e.g. device IDs) identifying all terminal devices on which the application has been installed. The AG 2 can then generate and send a notification message to each of the identified terminal devices. The notification message may, for example, contain the software ID and version number of the update, as well as a link (e.g. a URL) to the update script stored in a scripts portion 40 of application developer registry 38.

Upon receipt of the notification message, the Runtime Environment (RE) can extract the software ID and version number from the message, and use this information to determine whether or not the update can be safely installed on the terminal device. This evaluation may take the form of the following compatibility checks:

Compare the "new" version number with the current version number saved in the terminal device registry (TD-REG) 28 to identify which aspects of the application are changed by the update. This function can, for example, be accomplished by field-wise subtraction of the new and current version numbers. For example, consider a case in which the current version number is "2.2.1", and the new version number contained in the notification message is "2.3.2". Field-wise subtraction of the current version number from the new version number yields "0.1.1", which indicates that the update involves: no changes to existing data components; a change to at least one existing message; and adds at least one new feature.

Determine whether any intervening updates must be installed before the "current" update identified in the notification message. This can be done using the subtraction result calculated above. In particular, if any field of the subtraction result has a value greater than "1", then there is at least one update that must be installed before the "current" update.

In general, addition of new features will not create any compatibility issues. However, changes to existing data components or messages can have compatibility problems, because it there is a possibility that user-data saved in the memory may not be compatible with the revised data and/or message definitions. In such cases, installation of the update will require conversion of the saved data, and the ability to perform such conversion may be limited by the hardware capabilities of the terminal device. In addition, data conversion carries a risk that some data may be corrupted or lost, and thus it is possible that the user may prefer to not install the update, even if the required conversion function is within the abilities of the terminal device.

Accordingly, if the RE determines that the update affects existing data components and/or existing messages, then the RE can provide a warning message to the user, indicating that an update is available but that its installation may cause a loss or corruption of data. The user can then choose whether or not the update should be installed. Alternatively, the update script defined by the application developer using the AD tool may perform data transformations on incompatible updates.

When (or if) the user elects to install the update, or if the RE determines that there are no compatibility issues (i.e. the update ONLY adds new features), the RE can initiate installation of the update by opening the link (URL) contained in the update notification message, and thereby access and download the update script. Upon successful download of the update script from the scripts portion 40 of the application developer registry (AD-REG) 38, the RE can then launch the script, which then controls the downloading and installation of the update files from an update files portion 42 of the application developer registry 38.

Upon successful installation of the update, the RE then updates the "current" version number of the application stored in the terminal device registry, using the update version number received in the update notification message, and sends an update complete message to the AG 2. On receipt of the update complete message, the AG 2 updates the device profile with the new version number, to thereby indicate that the software update has been successfully installed on the terminal device 14b.

A limitation of the scenario depicted in FIG. 4 is that the AG 2 initiates the update distribution scenario (e.g. in response to receipt of the update notification message from the AD 36) by sending notifications to every terminal device on which the affected software is installed. This can result in an undesirable flooding of notification messages into the network, which may tax wireless network bandwidth. In addition some terminal devices may not be connected when the AG sends the notifications, with the result that the "disconnected" terminal device could miss the update. These problems can be overcome by the asynchronous distribution scenario described below with reference to FIG. 5.

Figure 5:
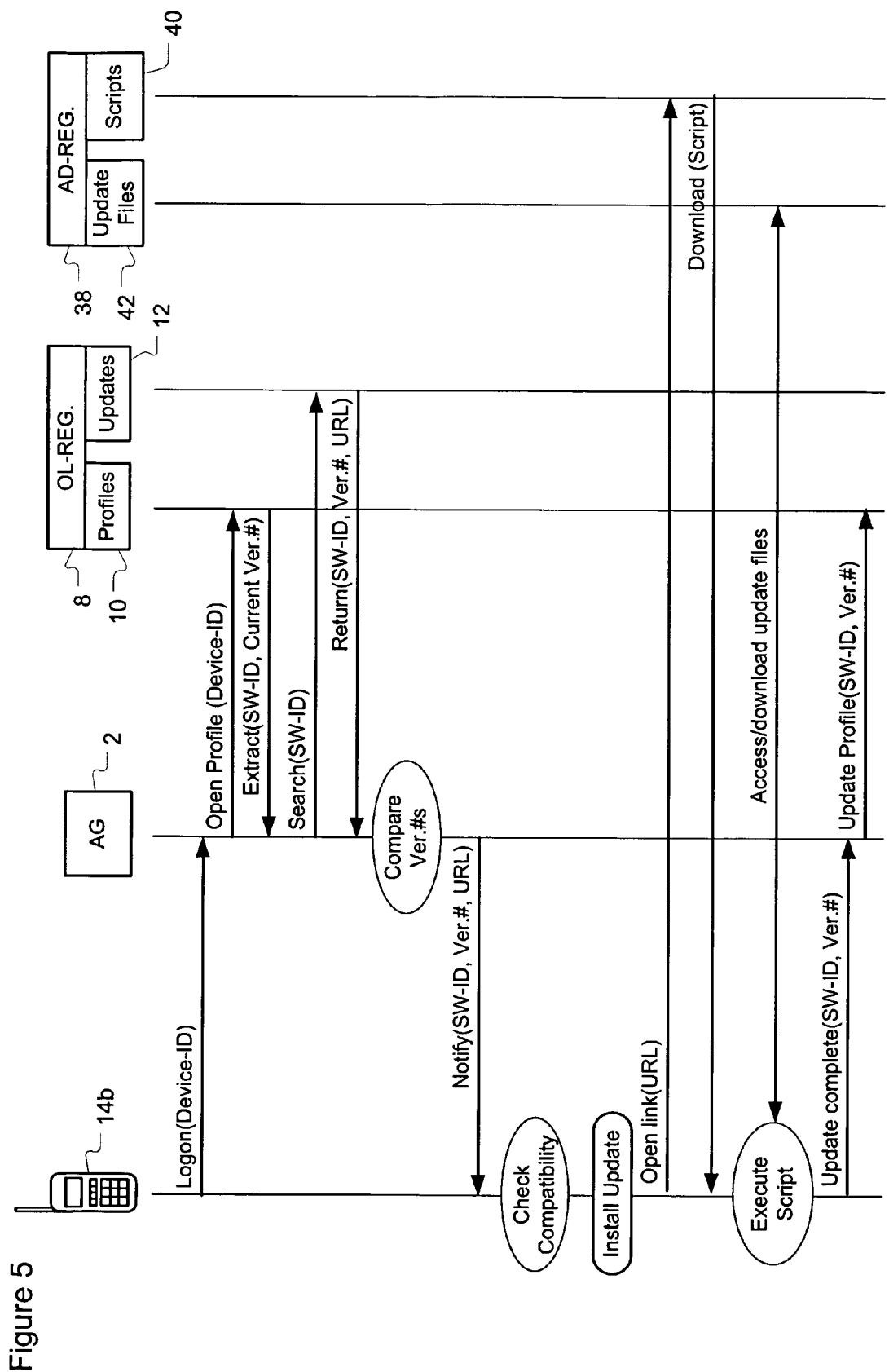
FIG. 5 is a message flow diagram schematically illustrating a process for installing a software upgrade on a terminal device in accordance with another embodiment of the present invention.

In the distribution scenario illustrated in FIG. 5, asynchronous distribution is triggered by the terminal device. In the illustrated example, the triggering event is when the terminal device logs onto the AG 2, although other events may also be used. For example, the RE could send a message to the AG 2 to check for updates in accordance with a predetermined schedule, or when an application is launched on the terminal device 14b. In any case, the AG 2 responds to the terminal device 14b by accessing the terminal device's profile to identify each application installed on the terminal device 14b, and the current version number. This information is then used to search the updates registry 12 to identify any logged update affecting the terminal device 14b, and the corresponding update version numbers. Comparison between the current and update version numbers then enables the AG 2 to determine whether there are any updates for the terminal device 14b which have not yet been installed.

The AG 2 then formulates an appropriate update notification message for each un-installed update, which is forwarded to the terminal device 14b. Subsequent processing by the terminal device 14b to examine the update notification message and install updates follows the process described above with reference to FIG. 4, that is, the terminal device 14b checks compatibility, and then installs the update by opening a link (URL) to download a script from the AD-REG 38. Executing the script on the terminal device enables access and downloading of the updates files stored in the AD-REG 38. When the update is complete, the terminal device signals the completion of the update to the AG 2 by communicating to the AG the software ID and the version number. The AG then updates the profile in the profiles registry 10 by communicating the software ID and the version number to the profiles registry 10.

The embodiments of the invention described above are intended to be exemplary only. The scope of the invention is therefore intended to be limited solely by the scope of the appended claims.

A portion of the disclosure of this patent document may contain material that is subject to copyright protection. The copyright owner has no objection to the facsimile reproduction by anyone of the patent document or patent disclosure, as it appears in the Patent and Trademark Office patent file or records, but otherwise reserves all copyright.

We claim:

1. A computer-implemented method of controlling asynchronous installation of a software update on a terminal device of a plurality of terminal devices on a wireless network, the method comprising steps of:

at an application gateway mediating between the plurality of terminal devices and an online profiles registry, the online profiles registry containing information identifying applications installed on each of the plurality of terminal devices, the application gateway including a processor:

receiving, at the application gateway, an update notification message in respect of the software update, the update notification message comprising:
  a software identifier uniquely identifying an application affected by the update;
  a version number associated with the software update; and
  an address of an update script on a data network accessible by the terminal device, the update script being adapted to install the software update on the terminal device;
based on the software identifier, searching, using the application gateway, the online profiles registry to identify terminal devices on which the application identified by the software identifier is installed; and
forwarding, from the application gateway, a notification message to the identified terminal devices, the notification message including the software identifier, the version number and the address of the update script,
wherein the profiles registry comprises a plurality of profiles, each profile being associated with a respective terminal device and containing, for each application installed on the respective terminal device, the respective software identifier of the application, and a current version number indicative of a version of the installed application, and wherein the step of searching the profiles registry comprises a step of identifying each terminal device for which the software identifier of the update matches that of an application installed on the terminal device.

2. A method as claimed in claim 1, wherein the data network is an Internet Protocol (IP) network, and the address of an update script comprises a Uniform Resource Locator (URL) address of the update script on the IP network.

3. A method as claimed in claim 1, further comprising the step of logging, using the application gateway, the update notification message in an updates registry, wherein the logging comprises a step of storing at least the software identifier, the version number and the address of the update script in the updates registry.

4. A method as claimed in claim 3, wherein the step of forwarding the notification message comprises steps of:
  receiving a message from a given terminal device of the plurality of terminal devices;
  accessing a profile associated with the given device, the profile containing information identifying software installed on the given terminal device;
  searching the updates registry using the profile to identify any software updates affecting software installed on the given terminal device; and
  sending a notification message to the given terminal device in respect of each identified software update.

5. A method as claimed in claim 4, wherein the profile contains, for each software application installed on the given terminal device, the respective software identifier, and a current version number indicative of a version of the software application, and wherein the step of searching the updates registry further comprises steps of:
  comparing the version number associated with the software update with the current version number; and
  identifying each software update for which at least one field of the associated version number is greater than a corresponding field of the current version number.

6. A method as claimed in claim 1, further comprising a step of identifying each terminal device for which at least one field of the version number associated with the software update is greater than a corresponding field of the current version number.

7. A method as claimed in claim 1 wherein the script is further adapted to perform a data transformation on an incompatible update.

8. A computer-implemented method of controlling installation of a software update on a terminal device of a plurality of terminal devices on a wireless network, the terminal device including a wireless transceiver and a processor, the method comprising steps of: via the wireless transceiver of the terminal device, receiving, from an application gateway mediating between the terminal device and an online profiles registry, the online profiles registry containing information identifying applications installed on each of the plurality of terminal devices, an update-notification message comprising information respecting an available software update, the update notification message being based on a search of the online profiles registry by the application gateway, the update notification message comprising:
  a software identifier uniquely identifying an application affected by the update;
  a version number associated with the software update; and
  an address of an update script on a data network accessible by the terminal device, the update script being adapted to install the software update on the terminal device;
  at the terminal device:
    determining a compatibility of the software update using the update version number;
    accessing the update script using the address; and
    executing the update script; and
    transmitting, using the wireless transceiver of the terminal device, an update complete message to the application gateway,
  wherein the step of determining a compatibility of the software update comprises a step of comparing the update version number to a current version number of the affected application, and wherein the update and current version numbers are defined in accordance with a version schema comprising a respective field for each one of a plurality of aspects of the application, and wherein the step of comparing the update version number to the current version number comprises a step of subtracting a value of each field of the current version number from the value of the corresponding field of the update version number.

9. A method as claimed in claim 8, further comprising, if a numerical value of any field of the subtraction result is greater than 1, a step of determining that at least one other software update must be installed prior to installation of the software update.

10. A method as claimed in claim 8, wherein the version schema comprises at least one "Data" field corresponding to data components of the application, and wherein the step of determining a compatibility of the software update comprises, if the numerical value of the "Data" field of the subtraction result is greater than "0", determining that the software update may require conversion of user data stored on the terminal device.

11. A method as claimed in claim 8, wherein the version schema comprises at least one "Messages" field corresponding to message components of the application, and wherein the step of determining a compatibility of the software update comprises, if the numerical value of the "Messages" field of the subtraction result is greater than "0", determining that the software update may require conversion of user messages stored on the terminal device.

12. A method as claimed in claim 8, wherein the version schema comprises at least one "RE" field corresponding to a runtime environment of the application, and wherein the step of determining a compatibility of the software update comprises, if the numerical value of the "RE" field of the subtraction result is greater than "0", determining that a runtime environment of the application must be updated before the software update.

13. A method as claimed in claim 8 wherein the script is further adapted to perform a data transformation on an incompatible update.

14. A system for controlling asynchronous installation of a software update on a terminal device of a wireless network, the system comprising:

a first computing device connected to a data network for communicating with an application gateway mediating the data network and the wireless network;

an application development environment running on a processor of the computing device for enabling the application to be updated and for further enabling update scripts and update files to be uploaded to an application developer registry that is accessible through the data network for subsequent downloading by the terminal device via the application gateway; and a second computing device connected to the data network, the second computing device comprising a memory for storing an online registry, the online registry comprising:

a profiles registry containing, for each terminal device, a listing of information identifying software applications stored on the terminal device; and an updates registry containing information identifying any available application updates.

15. The system as claimed in claim 14 wherein the terminal device comprises a memory for storing a terminal device registry identifying software applications loaded on the terminal devices and a version number corresponding to each of the software applications loaded on the terminal device.

16. The system as claimed in claim 14 wherein the application development environment comprises a versioning module for assigning a version number based on changes made to the software application.

17. The system as claimed in claim 14 wherein the online registry is co-resident with the application gateway.

18. The system as claimed in claim 14 wherein the first computing device and the second computing device are the same computing device.

\* \* \* \* \*

UNITED STATES PATENT AND TRADEMARK OFFICE
CERTIFICATE OF CORRECTION

| | | |
|---|---|---|
| PATENT NO. | : 7,747,995 B2 | |
| APPLICATION NO. | : 11/402112 | |
| DATED | : June 29, 2010 | |
| INVENTOR(S) | : Fritsch et al. | |

It is certified that error appears in the above-identified patent and that said Letters Patent is hereby corrected as shown below:

Column 2, line 48, "runt" should read --run- --.
Column 2, line 49, "ime" should read --time--.
Column 5, TABLE 1, line 5, "of change" should read --or change--.
Column 6, line 51, "has be" should read --has been--.
Column 7, line 29, "because it there" should read --because there--.

Signed and Sealed this
Nineteenth Day of July, 2011

David J. Kappos
*Director of the United States Patent and Trademark Office*